US012607920B2

(12) United States Patent (10) Patent No.: US 12,607,920 B2

Kriman et al. (45) Date of Patent: Apr. 21, 2026

(54) FOLDED PROJECTION AND DETECTION SYSTEM

(71) Applicant: APPLE INC., Cupertino, CA (US)

(72) Inventors: Moshe Kriman, Tel Aviv (IL); Maoz Ovadia, Kiryat Ono (IL); Dana Gal-Fuss, Tel Aviv (IL)

(73) Assignee: Apple Inc., Cupertino, CA (US)

( * ) Notice: Subject to any disclaimer, the term of this patent is extended or adjusted under 35 U.S.C. 154(b) by 910 days.

(21) Appl. No.: 17/895,116

(22) Filed: Aug. 25, 2022

(65) Prior Publication Data

US 2024/0069422 A1     Feb. 29, 2024

(51) Int. Cl.
*G03B 21/20*     (2006.01)
*G02B 3/00*     (2006.01)

(52) U.S. Cl.
CPC ....... *G03B 21/2066* (2013.01); *G02B 3/0068* (2013.01)

(58) Field of Classification Search
CPC ... G03B 21/2066; G02B 3/0068; G02B 1/002
See application file for complete search history.

(56) References Cited

U.S. PATENT DOCUMENTS

| | | | |
|---|---|---|---|
| 9,400,177 | B2 | 7/2016 | Pessach |
| 10,795,168 | B2 | 10/2020 | Riley, Jr. et al. |
| 11,988,844 | B2 | 5/2024 | Riley, Jr. et al. |
| 2013/0314765 | A1 | 11/2013 | Padilla et al. |
| 2015/0219806 | A1 | 8/2015 | Arbabi et al. |

| | | | |
|---|---|---|---|
| 2019/0064532 | A1 | 2/2019 | Riley et al. |
| 2019/0173191 | A1 | 6/2019 | Kamali et al. |
| 2019/0227421 | A1 | 7/2019 | Kriman et al. |
| 2019/0243155 | A1 | 8/2019 | You et al. |
| 2019/0346658 | A1 | 11/2019 | She et al. |
| 2020/0072668 | A1 | 3/2020 | Han et al. |
| 2020/0150311 | A1 | 5/2020 | Zhang et al. |
| 2020/0174163 | A1 | 6/2020 | Han et al. |
| 2020/0209729 | A1 | 7/2020 | Chen et al. |
| 2020/0264343 | A1 | 8/2020 | Han et al. |
| 2020/0271941 | A1 | 8/2020 | Riley, Jr. et al. |
| 2020/0284883 | A1 | 9/2020 | Ferreira et al. |

(Continued)

FOREIGN PATENT DOCUMENTS

| | | |
|---|---|---|
| CN | 210376902 U | 4/2020 |
| CN | 114578141 A | 6/2022 |

(Continued)

OTHER PUBLICATIONS

U.S. Appl. No. 17/512,700 Office Action dated Jul. 16, 2024.

(Continued)

*Primary Examiner* — James C. Jones

(74) *Attorney, Agent, or Firm* — Meitar Patents LTD.; Daniel Kligler

(57)     ABSTRACT

An optical device includes a substrate that includes a parallelepiped of a transparent dielectric material. The substrate is configured for propagation of a beam of optical radiation through the substrate along a beam path that includes multiple internal reflections within the substrate. The device further includes first and second optical metasurfaces disposed on one or more faces of the substrate at different, first and second points of incidence of the beam path with the one or more faces.

18 Claims, 12 Drawing Sheets

(56) References Cited

U.S. PATENT DOCUMENTS

| | | | | |
|---|---|---|---|---|
| 2020/0348176 A1* | 11/2020 | Faraji-Dana | .......... | G01J 3/1804 |
| 2021/0055551 A1 | 2/2021 | Chi et al. | | |
| 2021/0066370 A1 | 3/2021 | Cho et al. | | |
| 2021/0103075 A1 | 4/2021 | Park et al. | | |
| 2021/0149081 A1 | 5/2021 | Groever et al. | | |
| 2021/0337140 A1 | 10/2021 | Siddique et al. | | |
| 2021/0373242 A1 | 12/2021 | Lee | | |
| 2021/0382371 A1 | 12/2021 | Ni et al. | | |
| 2021/0392252 A1 | 12/2021 | Wang et al. | | |
| 2022/0109287 A1 | 4/2022 | Lenef et al. | | |
| 2022/0146079 A1 | 5/2022 | Tamma et al. | | |
| 2022/0155504 A1 | 5/2022 | Hsieh et al. | | |
| 2022/0179125 A1 | 6/2022 | Ren et al. | | |
| 2022/0229207 A1 | 7/2022 | Li et al. | | |

FOREIGN PATENT DOCUMENTS

| | | |
|---|---|---|
| IN | 202141034149 | 8/2021 |
| IN | 202231005502 | 3/2022 |

OTHER PUBLICATIONS

U.S. Appl. No. 17/512,700 Office Action dated Oct. 18, 2024.

Khorasaninejad et al., "Metalenses at Visible Wavelengths: Diffraction-limited Focusing and Subwavelength Resolution Imaging," Science, vol. 352, issue 6290, pp. 1190-1194, Jun. 3, 2016.

Ni et al. "Metasurface for Structured Light Projection over 120° Field of View," Nano Letters, vol. 20, issue 9, pp. 1-21, Aug. 10, 2020.

Savage et al., "Computing and Optics Team Up Over Metasurfaces", SPIE—The International Society for Optics and Photonics, Digital Library, pp. 1-6, Jul. 1, 2020.

Shaltout et al., "Ultrathin and Multicolour Optical Cavities with Embedded Metasurfaces," Nature Communications, vol. 9, issue 2673, pp. 1-7, year 2018.

Spagele et al., "Multifunctional Wide-angle Optics and Lasing Based on Supercell Metasurfaces," Nature Communications, vol. 12, issue 3787, pp. 1-10, year 2021.

Wei et al., "Silicon Metasurface Embedded Fabry-Perot Cavity Enables High Quality Transmission Structural Color," arXiv:2106. 14012 (physics.optics), pp. 1-5, Jun. 15, 2022.

* cited by examiner

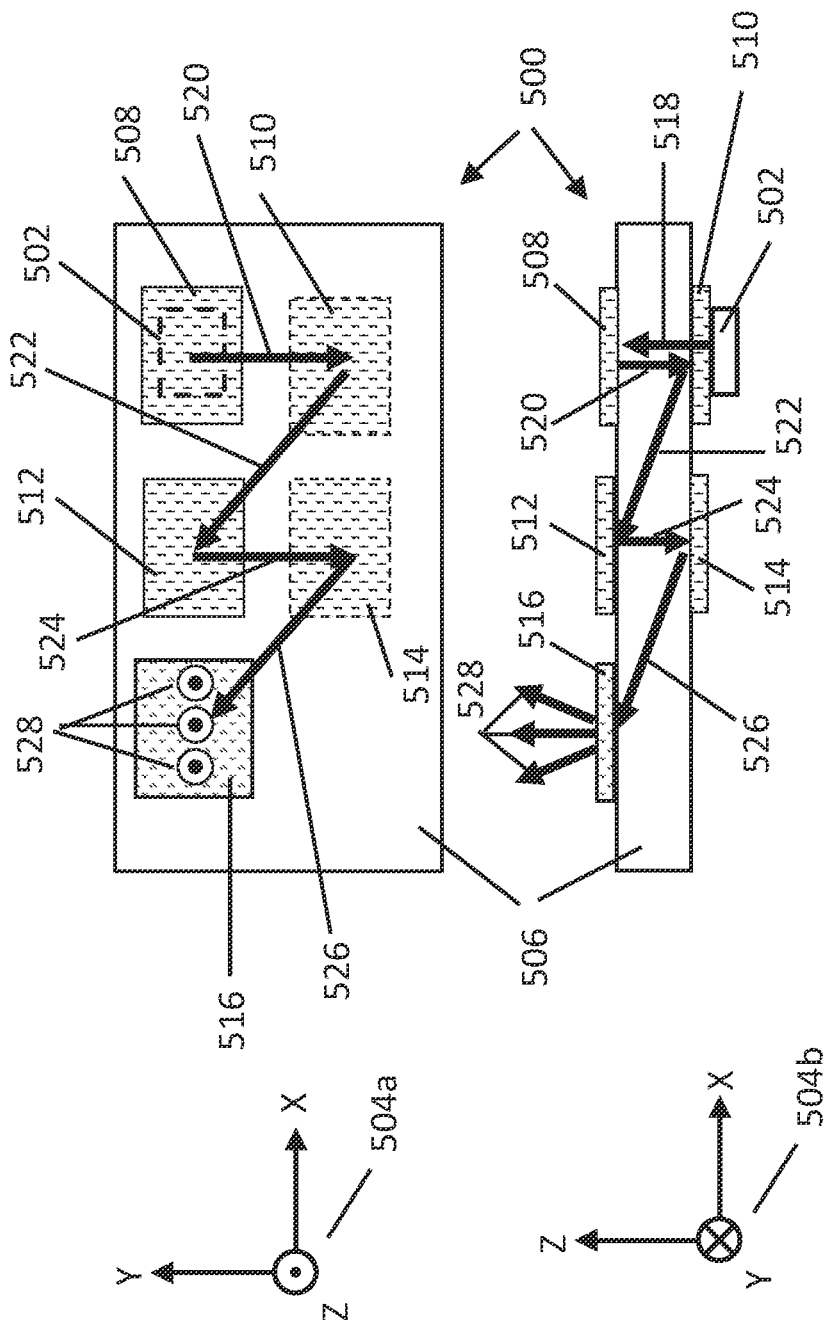

FOLDED PROJECTION AND DETECTION SYSTEM

FIELD OF THE INVENTION

The present invention relates generally to optical devices, and particularly to miniaturized integrated optical devices.

BACKGROUND

Miniaturized optical devices may be used in a variety of applications, such as projecting and/or detecting optical radiation. For example, a miniaturized optical device may be used in an optical pattern projector to cast a pattern of coded or structured light onto a scene for purposes of 3D mapping (also known as depth mapping).

An example of a miniaturized optical device, integrated into an optical pattern projector, is described in U.S. Patent Application Publication 2019/0227421. This publication describes an optical device, which includes a first plate having a first transparent region defining an exit face of the device, and a second plate having a second transparent region defining an entrance face of the device. At least one lens is formed over at least one of the first and second transparent regions. First and second planar reflectors are spaced apart and fixed between the first and second plates in mutually-parallel orientations diagonal to the first and second plates, thereby defining an optical path through the device from the entrance face, reflecting from the first and second reflectors, through the exit face and passing through the at least one refractive surface.

Optical metasurfaces are thin layers that comprise a two-dimensional pattern of repeating structures, having dimensions (pitch and thickness) less than the target wavelength of the radiation with which the metasurface is designed to interact. Optical elements comprising optical metasurfaces are referred to herein as "metasurface optical elements" (MOEs). The terms "optical rays" and "optical radiation," as used in the present description and in the claims, refer generally to electromagnetic radiation in any or all of the visible, infrared, and ultraviolet spectral ranges.

SUMMARY

Embodiments of the present invention that are described hereinbelow provide improved designs for miniaturized optical devices.

There is therefore provided, in accordance with an embodiment of the invention, an optical device, including a substrate including a parallelepiped of a transparent dielectric material configured for propagation of a beam of optical radiation through the substrate along a beam path that includes multiple internal reflections within the substrate. First and second optical metasurfaces are disposed on one or more faces of the substrate at different, first and second points of incidence of the beam path with the one or more faces.

In some embodiments, the first optical metasurface is configured to deflect the beam of optical radiation entering the substrate so that the beam propagates through the substrate along the beam path. In a disclosed embodiment, the second optical metasurface is configured to couple the beam of optical radiation propagating along the beam path out of the substrate while splitting the beam into multiple output beams.

Additionally or alternatively, at least one of the first and second optical metasurfaces is configured to focus the beam propagating along the beam path.

In some embodiments, the device includes one or more reflectors disposed on one or more of the faces at one or more further points of incidence of the beam path with the one or more faces. In one embodiment, the first and second optical metasurfaces are both disposed on a first face of the substrate, and the one or more reflectors are disposed on a second face of the substrate, opposite the first face. In another embodiment, the first and second optical metasurfaces are disposed respectively on an entrance face and an exit face of the substrate, such that the beam enters the substrate through the first optical metasurface and exits the substrate through the second optical metasurface, and the one or more reflectors are disposed respectively on first and second side faces of the substrate, which are angled obliquely relative to the entrance and exit faces.

In some embodiments, the first and second optical metasurfaces are disposed respectively on opposing, first and second faces of the substrate. In one embodiment, the beam enters the substrate through an entrance face of the substrate and exits the substrate through an exit face of the substrate, wherein the first and second faces are angled obliquely relative to the entrance and exit faces.

In some embodiments, the device includes at least a third optical metasurface disposed on at least one of the faces of the substrate at one or more further points of incidence of the beam path with the one or more faces. In a disclosed embodiment, at least one of the optical metasurfaces is configured to deflect the beam within the substrate at an oblique angle, such that the beam path is not contained within a single plane.

In some embodiments, the first and second optical metasurfaces include arrays of pillars of varying diameters, which are formed on the one or more faces of the substrate. The pillars may include a semiconductor material and/or a metallic material.

In disclosed embodiments, at least one of the first and second optical metasurfaces is configured for transmission of the beam therethrough. Additionally or alternatively, at least one of the first and second optical metasurfaces is configured for reflection of the beam therefrom. In a disclosed embodiment, a reflective layer disposed over the at least one of the first and second optical metasurfaces that is configured for reflection.

There is also provided, in accordance with an embodiment of the invention, an optoelectronic apparatus, including an emitter configured to emit a beam of coherent optical radiation. An optical substrate including a parallelepiped of a transparent dielectric material is positioned to intercept the beam emitted by the emitter and configured for propagation of the beam through the optical substrate along a beam path that includes multiple internal reflections within the substrate. At least first and second optical metasurfaces are disposed on one or more faces of the optical substrate at different, first and second points of incidence of the beam path with the one or more faces, and configured to couple the beam out of the substrate while splitting the beam into multiple output beams.

In a disclosed embodiment, the at least first and second optical metasurfaces are configured to collimate the multiple output beams so as to project a pattern of spots onto a target, and the apparatus includes an imaging device, which includes a detector array and one or more metasurface optical elements, which are configured to image the target onto the detector array.

Additionally or alternatively, the apparatus includes a circuit substrate, on which the emitter and the optical substrate are mounted.

The present invention will be more fully understood from the following detailed description of the embodiments thereof, taken together with the drawings in which:

BRIEF DESCRIPTION OF THE DRAWINGS

FIGS. 6a and 6b are schematic frontal and sectional views of an optical device, respectively, in accordance with an alternative embodiment;

DETAILED DESCRIPTION OF EMBODIMENTS

Figures 1A, 1B:
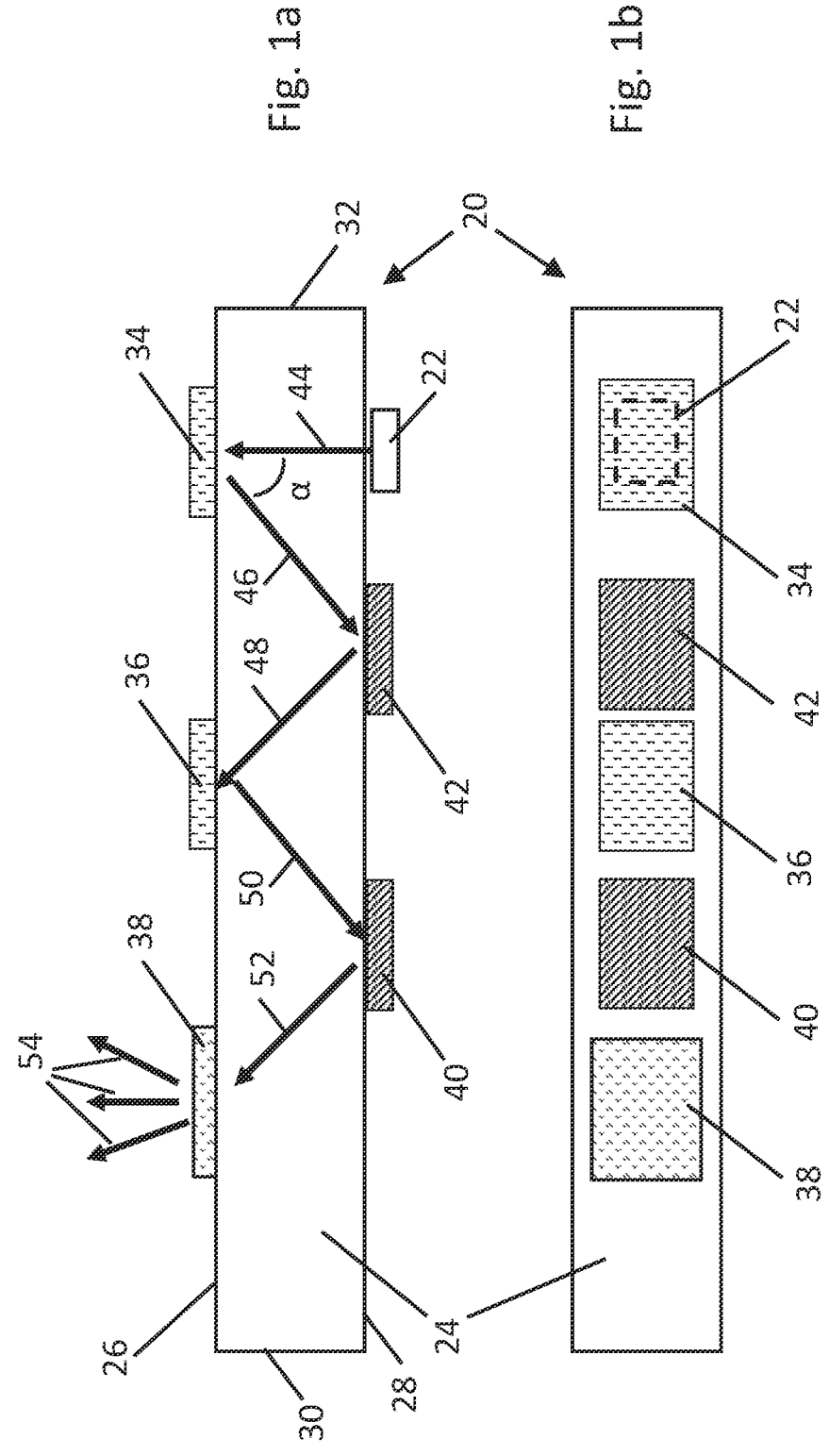
FIGS. 1a and 1b are schematic sectional and frontal views of an optical device, respectively, in accordance with an embodiment of the invention.

Mass production of miniaturized optical devices calls for product designs that meet the often-conflicting objectives of high precision and reliability and low manufacturing cost. Such designs typically require tight, well-controlled assembly tolerances, structural strength, and manufacturability with high yield, all within strict size and cost constraints.

Embodiments of the present invention that are described herein address these demands with an optical design that is folded within a substrate comprising a parallelepiped of transparent dielectric material. The design is "folded" in the sense that the beam path through the device includes multiple internal reflections within the substrate, in the course of passing from an entrance face of the device to its exit face. Metasurfaces are formed on one or more faces of the substrate at different, first and second points of incidence of the beam path with one or both faces and condition the beam as it passes through the substrate. The folded optical design, using metasurfaces on a monolithic substrate, enables versatile beam control in a compact package that is simple to fabricate.

The metasurfaces that are used in the embodiments described herein may be either reflective or transmissive, or may combine transmission and reflection. Each metasurface may have a specific optical functionality or a combination of functionalities for manipulating the beam, such as optical power (for focusing or collimation, for example), selectable direction of reflection or transmission, beam splitting, and coupling the beam into and out of the substrate. These metasurfaces with specified optical properties are also referred to herein as MOEs. In some of the embodiments that are described hereinbelow, MOEs are disposed on both faces of the substrate. In other embodiments, two or more MOEs are disposed on the same face of the substrate, at different points of incidence of the beam path, while the opposite face of the substrate passively reflects or transmits the beam. In either case, the thinness of MOEs (less than a wavelength), as well as the flexibility afforded by their designs and positions on the substrate, enable the present embodiments to offer compact, versatile optical devices.

In a disclosed embodiment, an MOE-based optical device of this sort is integrated into an optical pattern projector. In this embodiment, a source of optical radiation, such as a vertical-cavity surface-emitting laser (VCSEL), is mounted on a circuit substrate and positioned adjacent to the optical device. The VCSEL emits a beam of coherent optical radiation, which couples into the substrate of the optical device either directly through one its faces or through an MOE disposed on the face. The beam passes through the optical device along the beam path, and is coupled out of the substrate by a transmissive MOE, which splits the beam into multiple beams. These beams may be used to illuminate a scene, generating a pattern of spots of light on the scene. This patterned illumination may be used, for example, for pattern-based depth mapping of the scene.

Folded designs using MOEs in accordance with embodiments of the invention can be used not only in projection, but also in other applications, such as detection. In a disclosed embodiment, an MOE-based optical device is integrated into an optical imager. The optical device transmits and focuses an image of a scene onto an array of detectors. The optical pattern projector and the optical imager can be combined into a single unit to make a compact depth sensor.

Although the disclosed embodiments relate specifically to projection and detection of patterned radiation, MOE-based optical devices in accordance with the principles of the present invention may alternatively be used in other sorts of compact optical designs for both projection and imaging.

FIGS. 1a and 1b are schematic sectional and frontal views, respectively, of an optical device 20 together with a VCSEL 22, in accordance with an embodiment of the invention. Optical device 20 comprises a parallelepiped dielectric substrate 24, which is transparent at the wavelength of the optical radiation emitted by VCSEL 22. In the present embodiment, only a single pair of opposing faces 26 and 28 is utilized for the beam propagation, and consequently the dihedral angles of the other faces of substrate 24, such as side faces 30 and 32, may be freely chosen within the constraints of the optical components disposed on faces 26 and 28. Reflective MOEs 34 and 36 and a transmissive MOE 38 are formed on face 26, and planar reflectors 40 and 42, for example in the form of reflective coatings, are formed on face 28. The MOEs and reflectors on faces 26 and 28 are positioned to define the path of a beam 44, emitted by VCSEL 22, as it propagates by internal reflections within substrate 24.

VCSEL 22 emits beam 44 into substrate 24. Beam 44 impinges on MOE 34, which reflects and deflects the beam by an angle $\alpha$ into a beam 46, while simultaneously focusing the beam. (Simultaneous reflection, focusing, and deflection into a selectable angle is an example of combining multiple optical functionalities for manipulating an optical beam, while simultaneously controlling the optical performance by the design of MOE 34.) Reflector 42 reflects beam 46 into a beam 48, which impinges on MOE 36, which in turn reflects and further focuses beam 48 into a beam 50. Reflector 40 reflects beam 50 into a beam 52, which impinges on MOE 38. MOE 38 splits beam 52 into multiple output beams 54 and couples them out of substrate 24. As will be further described hereinbelow, such an arrangement may be used in an optical pattern projector.

The optical powers (focal lengths) of MOEs 34, 36, and 38 are determined so as to achieve a desired focal length for optical device 20. By appropriate choice of the optical powers, outgoing beams 54 can be well collimated, despite the high inherent divergence of beam 44 emitted by VCSEL 22. The long optical path within substrate 24 accommodates MOE lenses with long focal length, and the use of multiple MOEs enables correction of aberrations. In a conventional optical design, a substantial vertical distance would be required for these purposes between the VCSEL and the outer surface of the collimating lens. In the present embodiment, however, the height of device can be as small as 1 mm. Similar considerations are applied to the MOEs in the other embodiments described hereinbelow.

Figure 2:
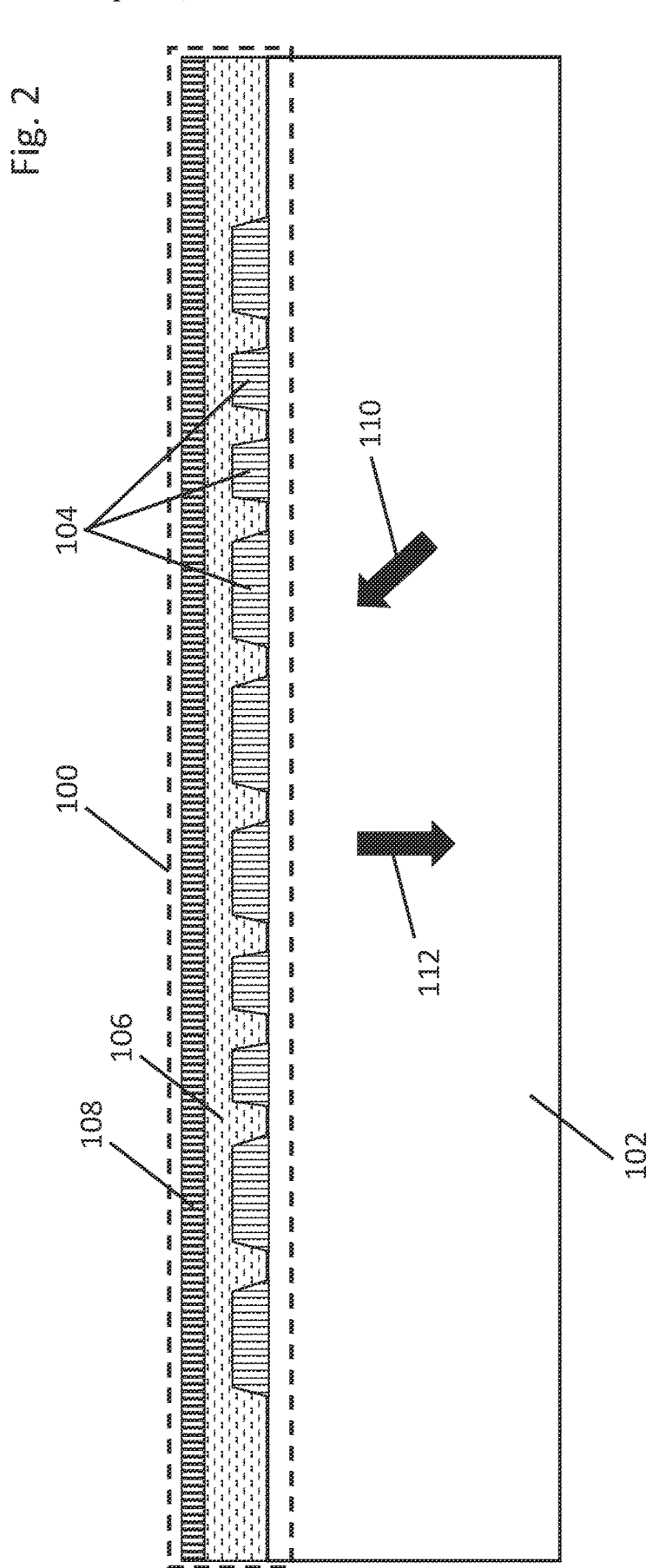
FIG. 2 is a schematic sectional view of a reflective MOE, in accordance with an embodiment of the invention.

FIG. 2 is a schematic sectional view of a reflective MOE 100 disposed on a substrate 102, in accordance with an embodiment of the invention. MOE 100 may be used, for example, in place of MOE 34 and/or MOE 36 in FIGS. 1*a/b*. MOE 100 comprises an array of metallic pillars 104 embedded in a silicon-dioxide ($SiO_2$) layer 106. A reflective metal layer 108, on top of $SiO_2$ layer 106, is disposed over the optical metasurface for enhancing the reflectivity of MOE 100. Substrate 102 comprises a dielectric material, such as glass, which is transparent at the wavelength of optical radiation with which MOE 100 is designed to interact. Assuming VCSEL 22 to operate at 940 nm, pillars 104 in a reflective MOE typically have a height of about 3-400 nm and a pitch (center-to-center distance between pillars) of 400-500 nm. (The drawings are not to scale.) The variations in pillar diameters are chosen to impart a desired phase profile to the incident radiation. Although FIG. 2 and the other detail figures show only a single row of pillars, in practice pillars 104 are arranged in a complex two-dimensional array on substrate 102.

MOE 100 is fabricated by etching metal pillars 104 into a metal layer deposited on substrate 102. After the etch, the space between and above metal pillars 104 is filled with a dielectric material, such as $SiO_2$, to form $SiO_2$ layer 106, followed by metal deposition to form metal layer 108. The pattern of metal pillars 104 is computed by first determining from an optical design the phase transformation (optical power, deflection angle) that MOE 100 is required to impose on an incident beam, and then computing the detailed widths of the metal pillars using, for example, an Iterated Fourier Transform Algorithm (IFTA). MOE 100 is also designed for reflectivity approaching 100%.

Other materials with a low refractive index may be used as alternatives to $SiO_2$ in layer 106. These materials include silicon nitride (SiN), boro-phosphosilicate glass (BPSG), benzocyclobutene (BCB), or spin-on glass (SoG).

As an example of the use of MOE 100, a beam 110 of optical radiation propagates within substrate 102 and impinges on the MOE. MOE 100 reflects, deflects, and (optionally) focuses beam 110 into a beam 112.

Figure 3:
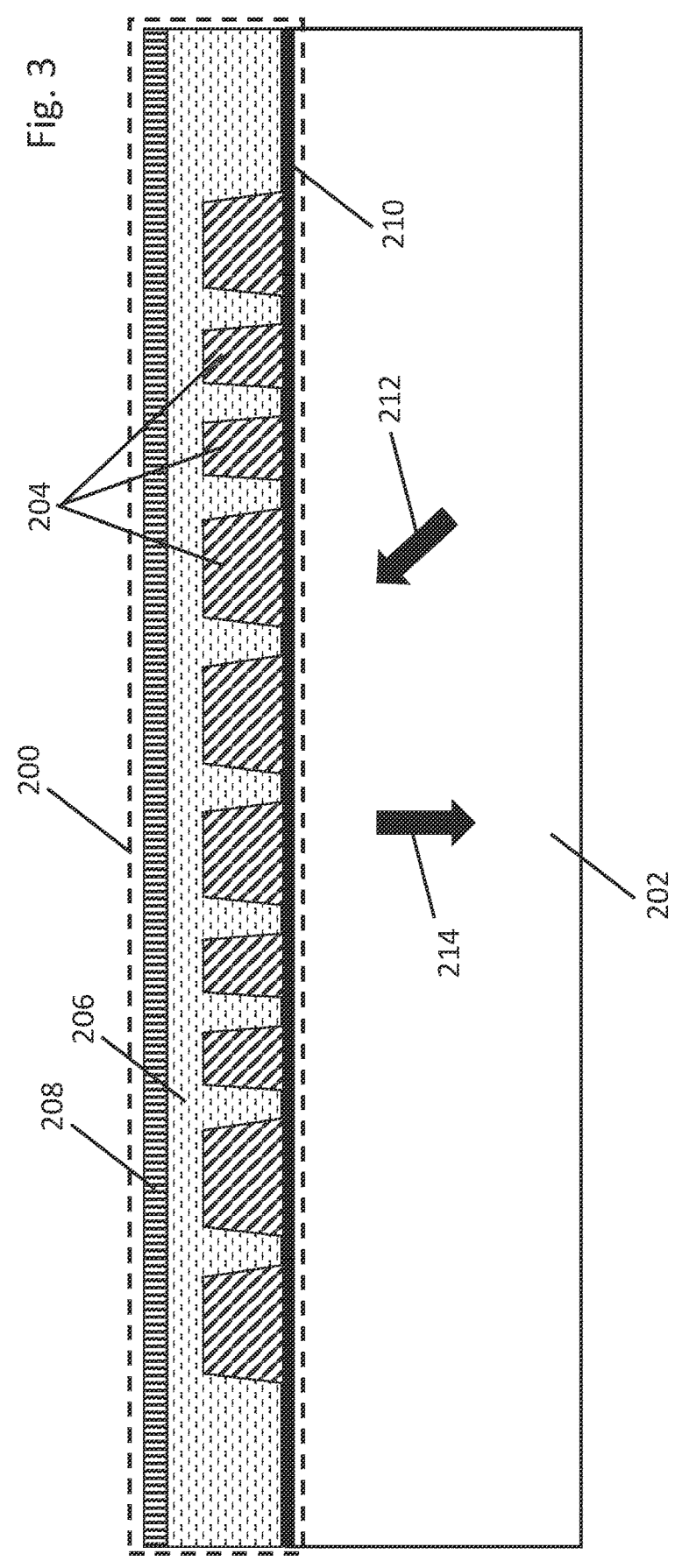
FIG. 3 is a schematic sectional view of a reflective MOE, in accordance with an alternative embodiment of the invention.

FIG. 3 is a schematic sectional view of a reflective MOE 200 disposed on a substrate 202, in accordance with an alternative embodiment of the invention. MOE 200 is similar to MOE 100 (FIG. 2), with the main difference being that MOE 200 comprises pillars 204 made from a semiconductor material, such as silicon, instead of metal pillars 104 of MOE 100. Silicon pillars 204 are embedded in an $SiO_2$ layer 206. A reflective metal layer 208 is disposed over the optical metasurface for enhancing the reflectivity of MOE 200. A SiN etch-stop layer 210 is used to control the etch depth of silicon pillars 204. Substrate 202 comprises a transparent dielectric material, similar to substrate 102 in FIG. 2.

MOE 200 is fabricated by etching silicon pillars 204 into a silicon layer deposited on substrate 202. After etching, the space between and above silicon pillars 204 is filled with a dielectric material, such as $SiO_2$, to form $SiO_2$ layer 206, followed by metal deposition to form metal layer 208. The pattern of silicon pillars 204 is computed similarly to the pattern of metal pillars 104 of MOE 100 (FIG. 2). A typical height of silicon pillars 204 is 700 nm, and, similarly to MOE 100, the pitch of the silicon pillars is typically between 400 and 500 nm for a design wavelength of 940 nm. Alternative low-index materials may be used similarly to MOE 100.

As an example of the use of MOE 200, a beam 212 of optical radiation propagates within substrate 202 and impinges on the MOE. Similarly to MOE 100, MOE 200 reflects, deflects, and (optionally) focuses beam 212 into a beam 214.

Figure 4:
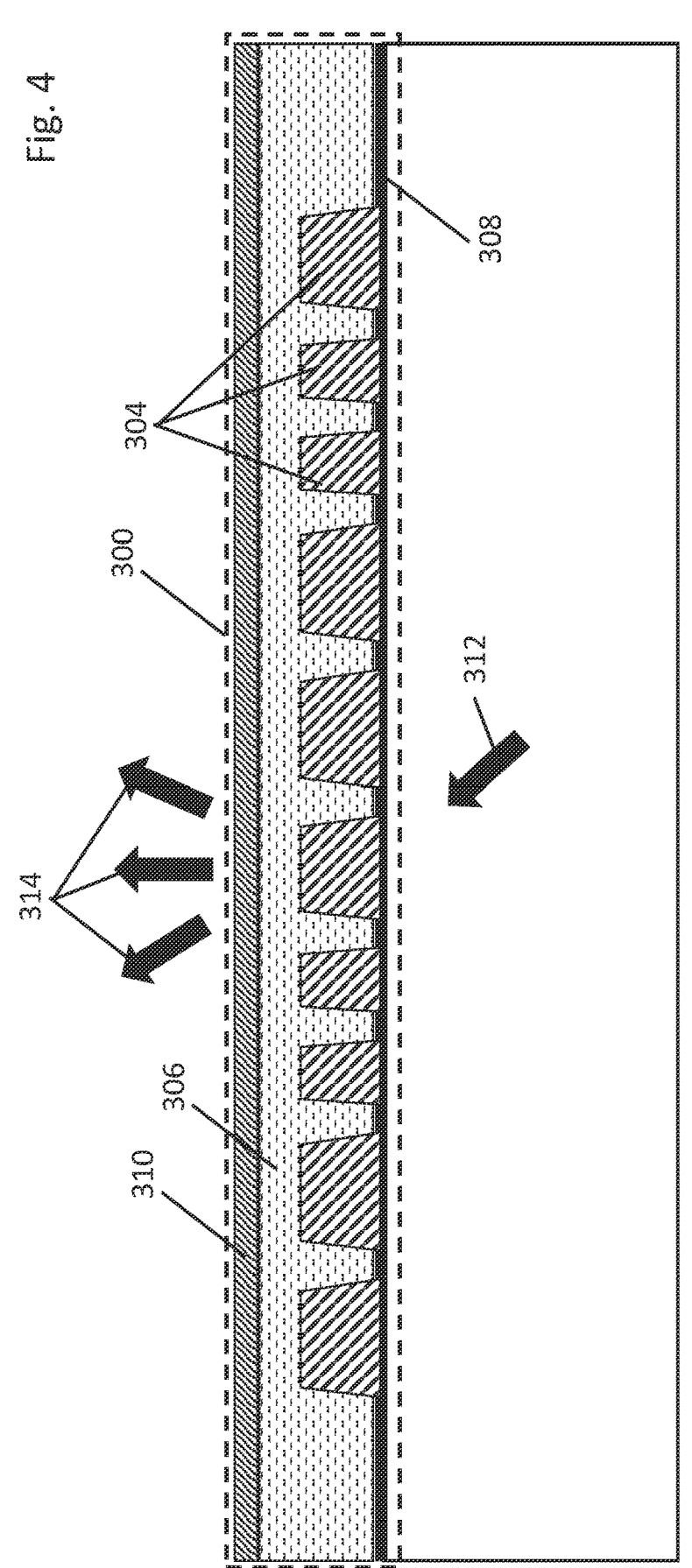
FIG. 4 is a schematic sectional view of a transmissive MOE, in accordance with an embodiment of the invention.

FIG. 4 is a schematic sectional view of a transmissive MOE 300 disposed on a substrate 302, in accordance with an embodiment of the invention. MOE 300 comprises, similarly to MOE 200 (FIG. 3), silicon pillars 304 embedded in an $SiO_2$ layer 306 and a SiN etch-stop layer 308 controlling the silicon etch. An optional anti-reflective (AR) coating 310 is deposited on the top of MOE 300. Substrate 302 comprises a transparent dielectric material, similar to substrate 102 in FIG. 2.

MOE 300 is fabricated similarly to MOE 200, except for the deposition of AR layer 310 instead of metal layer 208. The pattern of silicon pillars 304 is computed for achieving a required pattern of transmitted beams together with a high degree of transmissivity.

MOE 300 may be used in place of MOE 38 in device 20 (FIG. 1*a*). Thus, when a beam of optical radiation 312 that propagates within substrate 302 impinges on MOE 300, the MOE splits the radiation into multiple beams 314, which are coupled out of the substrate.

Figure 5:
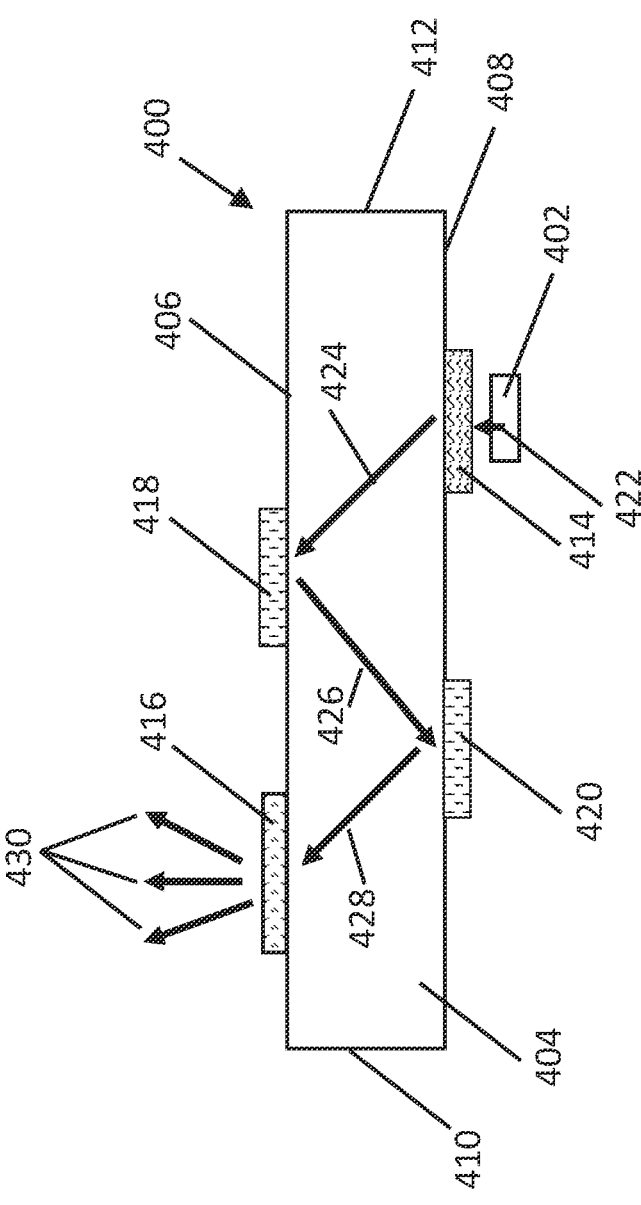
FIG. 5 is a schematic sectional view of an optical device, in accordance with an alternative embodiment.

FIG. 5 is a schematic sectional view of an optical device 400 together with a VCSEL 402, in accordance with an alternative embodiment of the invention.

Optical device 400 comprises a parallelepiped dielectric substrate 404, for example glass, which is transparent at the wavelength of the optical radiation emitted by VCSEL 402. Similarly to optical device 20 (FIGS. 1*a*-1*b*), the dihedral angles of the other faces of substrate 404 with respect to top and bottom faces 406 and 408, such as faces 410 and 412, are not critical.

Optical device 400 comprises two transmissive MOEs 414 and 416 and two reflective MOEs 418 and 420. The MOEs are disposed in the path of a beam 422 that is emitted by VCSEL 402 and propagates through substrate 404 along a beam path that includes multiple internal reflections within the substrate. By incorporating MOEs on both faces 406 and 408 or substrate 404 (rather than only on a single face as in device 20), a more compact, versatile design may be achieved, though at the possible expense of a more complex manufacturing process. Beam 422 impinges on transmissive MOE 414, which deflects (and optionally focuses) beam 422 into a beam 424. Beam 424 impinges on reflective MOE 418, which reflects and focuses the beam into a beam 426.

Beam 426 impinges on reflective MOE 420, which reflects and focuses the beam into a beam 428, which in turn impinges on transmissive MOE 416. MOE 416 splits beam 428 into multiple beams 430 and couples them out of substrate 404, similarly to MOE 38 in optical device 20.

FIGS. 6a and 6b are schematic frontal and sectional views, respectively, of an optical device 500 together with a VCSEL 502, in accordance with an alternative embodiment of the invention. Cartesian coordinate system 504a is used in describing optical device 500 in FIG. 6a, and Cartesian coordinate system 504b, rotated relative to coordinate system 504a, is used in describing the rotated view of the optical device in FIG. 6b.

Optical device 500 comprises a parallelepiped dielectric substrate 506, which is transparent at the wavelength of the optical radiation emitted by VCSEL 502. Optical device 500 further comprises four reflective MOEs 508, 510, 512, and 514, and a transmissive MOE 516, deposited on both the upper and lower faces of substrate 506 in the beam path of a beam 518 emitted by VCSEL 502. As shown in FIG. 6b, MOEs 508, 510, 512, 514, and 516 are offset from each other in the X- and Y-directions (with reference to Cartesian coordinates 504a), as opposed to optical devices 20 and 400, in which the MOEs are arranged in a linear configuration so that the beam propagates within a single vertical (X-Z) plane within the device. Consequently, some of the MOEs of optical device 500 are designed to reflect the beam propagating in substrate 506 at oblique angles, i.e., at angles outside the X-Z and Y-Z planes. In optical device 500, as in optical devices 20 and 400, the side walls of substrate 506 are not in the beam path, and may consequently be chosen freely.

VCSEL 502 emits beam 518 into substrate 506, where it impinges on MOE 508. (Beam 518 does not impinge on MOE 510, as would seem in FIG. 6b, since this MOE is offset in the -Y-direction from VCSEL 502.) MOE 508 reflects beam 518 into a beam 520, which propagates in the Y-Z-plane and impinges on MOE 510. MOE 510 reflects beam 520 into a beam 522, which propagates at an oblique angle to MOE 512. MOE 512 reflects beam 522 into a beam 524, which propagates in the Y-Z-plane and impinges on MOE 514. MOE 514 reflects beam 524 into an oblique beam 526, which impinges on transmissive MOE 516. MOE 516 splits beam 526 into multiple beams 528 and couples the beams out of substrate 506 (similarly to MOE 38 in optical device 20).

An advantage of optical device 500 over linear optical devices 20 and 400 is that it permits the realization of complex optical schemes in a more compact device.

Figure 7:
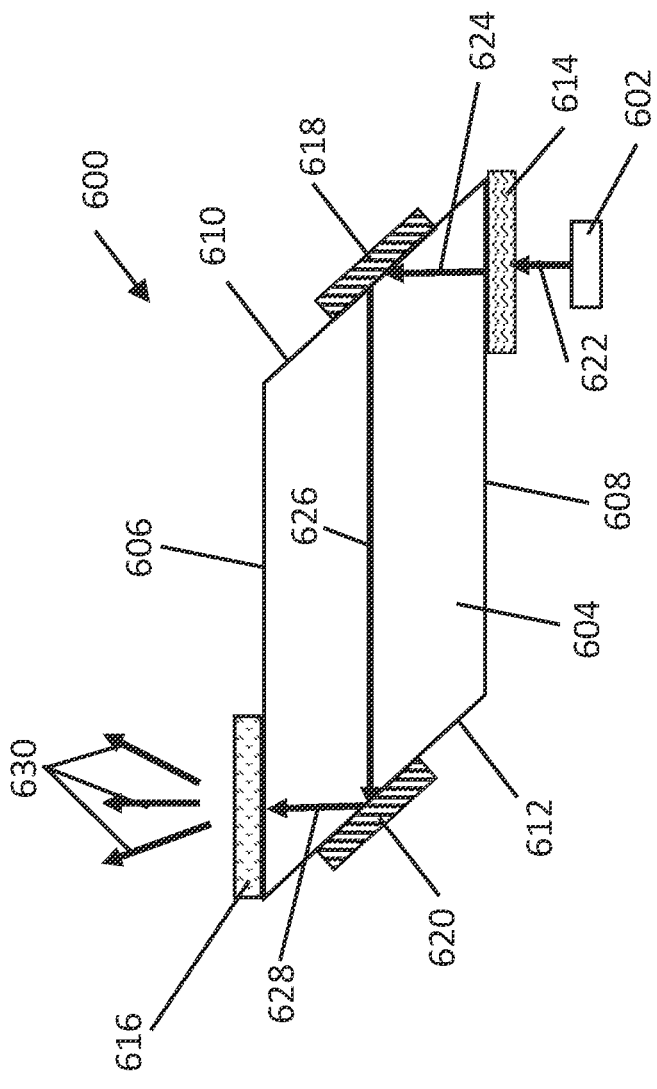
FIG. 7 is a schematic sectional view of an optical device, in accordance with an alternative embodiment of the invention.

FIG. 7 is a schematic sectional view of an optical device 600 together with a VCSEL 602, in accordance with an alternative embodiment of the invention. Optical device 600 comprises a parallelepiped dielectric substrate 604, which is transparent at the wavelength of the optical radiation emitted by VCSEL 602. In optical device 600, as opposed to optical devices 20, 400, and 500, four faces 606, 608, 610, and 612 of substrate 604 are included in the beam path. Consequently, the dihedral angles between these faces are selected so as to satisfy the requirements for the beam path. In the present example, faces 606 and 608 are angled obliquely relative to faces 610 and 612. Specifically, the dihedral angles between faces 606 and 608 and faces 610 and 612 are 45 degrees. Two transmissive MOEs 614 and 616 are disposed on respective faces 608 and 606, and two planar reflectors 618 and 620 are disposed on respective faces 610 and 612.

VCSEL 602 emits a beam 622, which impinges on MOE 614. MOE 614 couples beam 622 into substrate 604 and focuses it into a beam 624, which is reflected by reflector 618 into a beam 626. Reflector 620 reflects beam 626 into a beam 628, which impinges on MOE 616. MOE 616 splits beam 628 into multiple beams 630 and couples them out of substrate 604.

Figure 8:
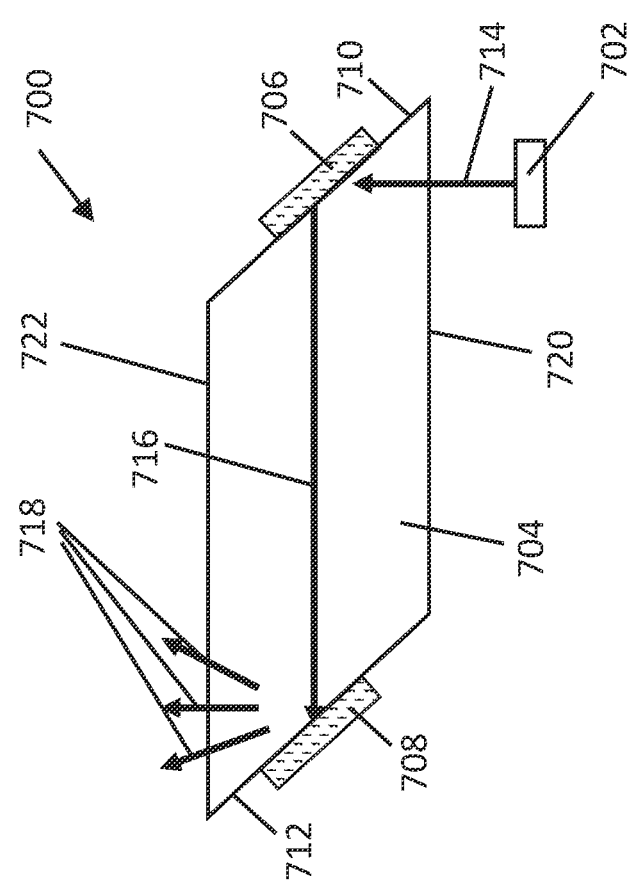
FIG. 8 is a schematic sectional view of an optical device together, in accordance with an alternative embodiment of the invention.

FIG. 8 is a schematic sectional view of an optical device 700 together with a VCSEL 702, in accordance with an alternative embodiment of the invention. Optical device 700 comprises a parallelepiped dielectric substrate 704 (similar to substrate 604 in FIG. 7), which is transparent at the wavelength of the optical radiation emitted by VCSEL 702. Optical device 700 further comprises two reflective MOEs 706 and 708, disposed respectively on faces 710 and 712 of substrate 704.

VCSEL 702 emits a beam 714, which enters substrate 704 through a face 720 and impinges on MOE 706. MOE 706 reflects and focuses beam 714 into a beam 716, which impinges on MOE 708. MOE 708 reflects and splits beam 716 into multiple beams 718, which exit substrate 704 through a face 722. Faces 710 and 712 are angled obliquely relative to faces 720 and 722.

Figure 9:
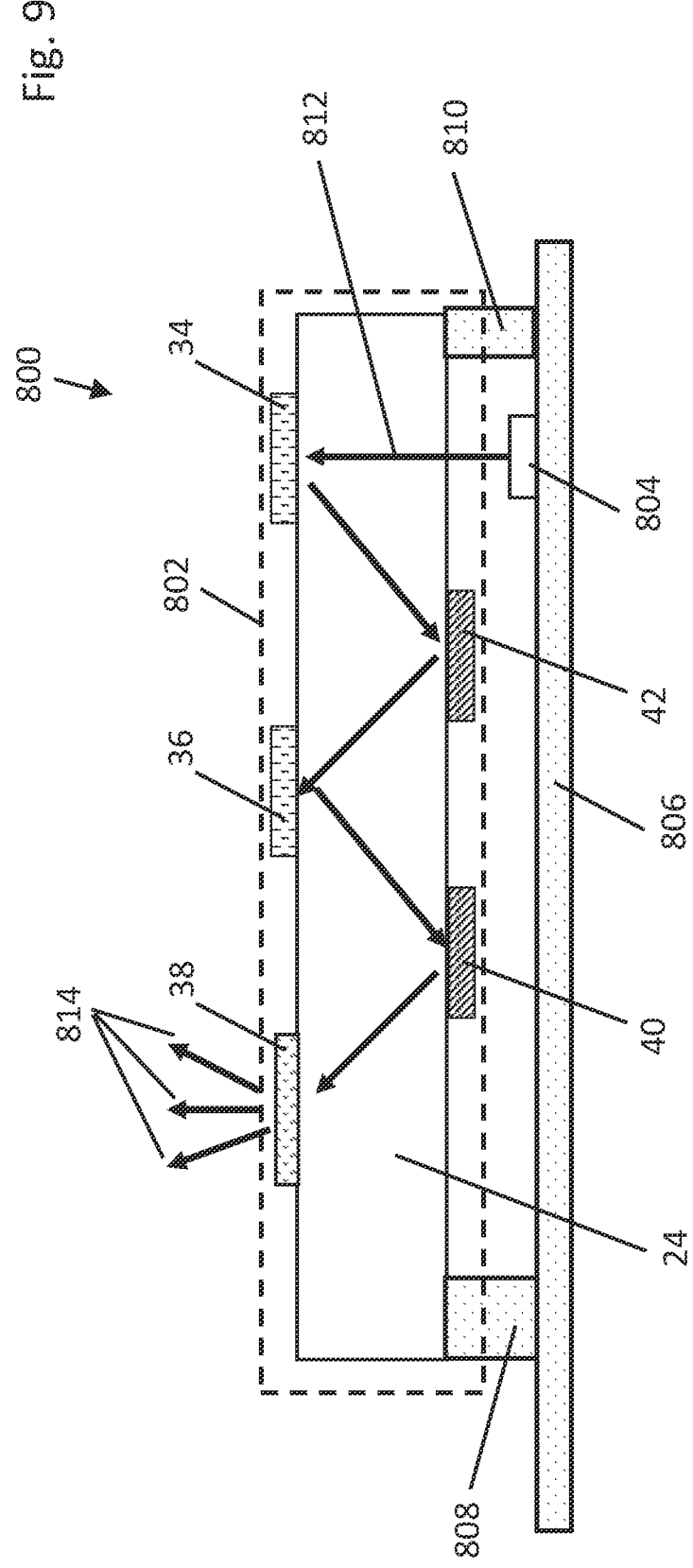
FIG. 9 is a schematic sectional view of a pattern projector, in accordance with an embodiment of the invention.

FIG. 9 is a schematic sectional view of an optical pattern projector 800, in accordance with an embodiment of the invention. Pattern projector 800 comprises an optical device 802, which is identical with or similar to optical device 20 in FIGS. 1a-1b. Due to the similarity, the individual components of optical device 802 are labeled as in FIGS. 1a-1b. This embodiment illustrates the use of an MOE-based optical device in producing a compact, monolithic optical projector.

A VCSEL 804 is bonded and electrically coupled to a circuit substrate 806. Optical device 802 is bonded to circuit substrate 806 using standoffs 808 and 810. VCSEL 804 emits a beam 812 of optical radiation into substrate 24. Beam 812 propagates in the substrate similarly to the propagation in optical device 20. MOE 38 couples the propagating beam out of substrate 24 and splits it into multiple beams 814.

Figure 10:
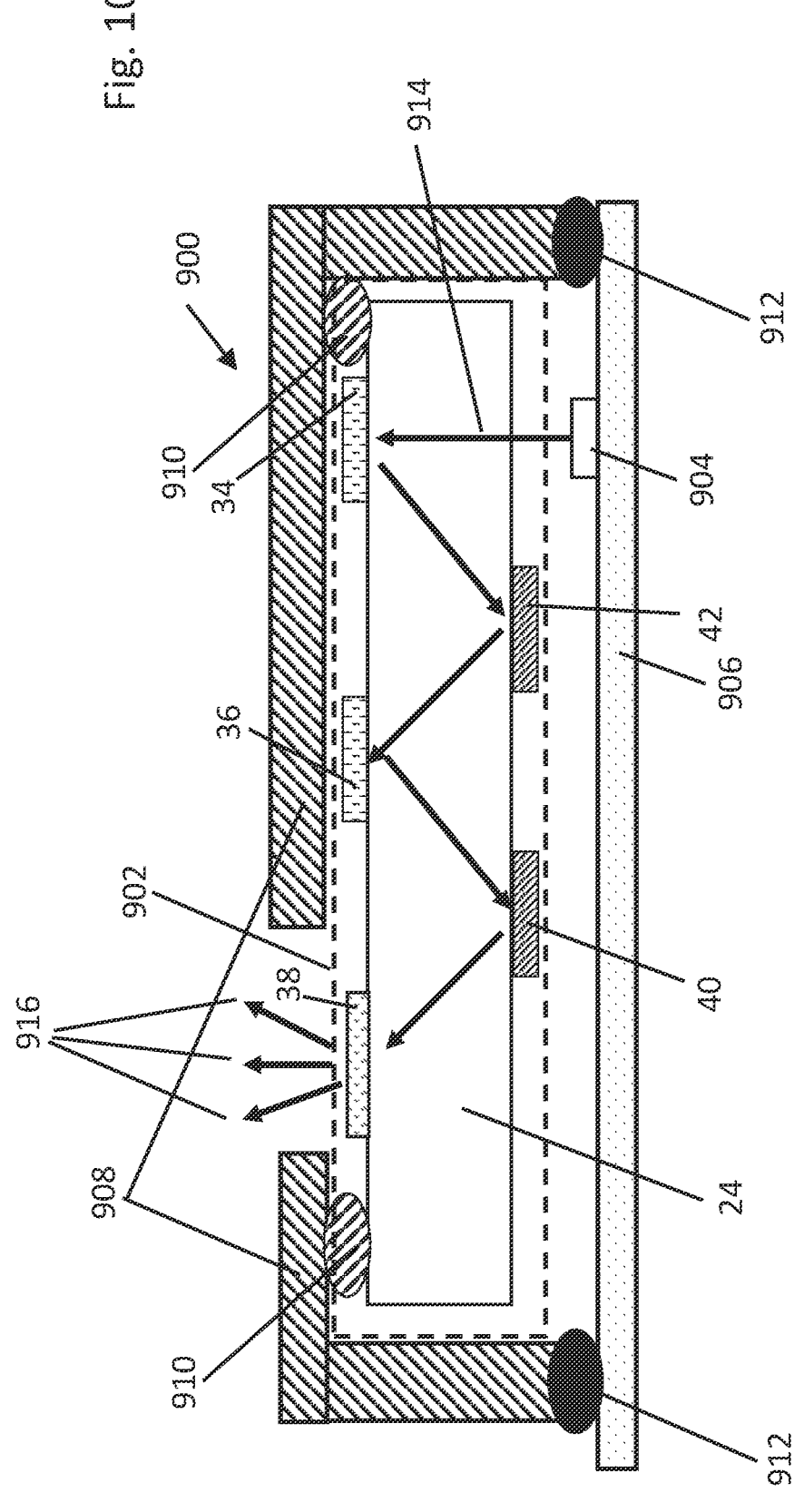
FIG. 10 is a schematic sectional view of a pattern projector, in accordance with an alternative embodiment of the invention.

FIG. 10 is a schematic sectional view of an optical pattern projector 900, in accordance with an alternative embodiment of the invention. Pattern projector 900 comprises an optical device 902, similar to optical device 802 in FIG. 9. A VCSEL 904 is bonded and electrically coupled to a circuit substrate 906. Optical device 902 is attached to a housing assembly 908 with cement 910. Housing assembly 908 is then bonded to circuit substrate 906 by cement 912 using active or passive alignment to position optical device 902 relative to VCSEL 904.

Figure 11:
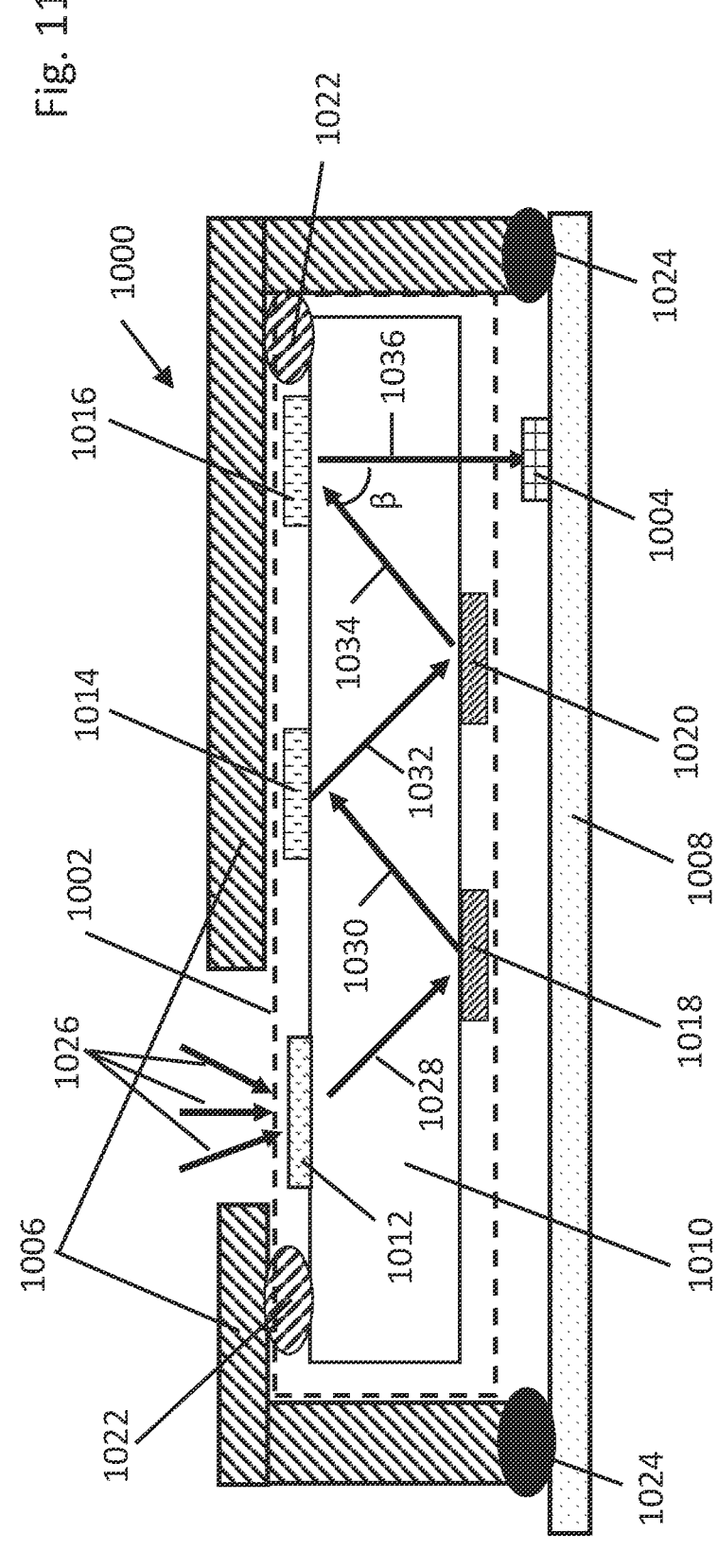
FIG. 11 is a schematic sectional view of an imaging device, in accordance with an embodiment of the invention.

FIG. 11 is a schematic sectional view of an optical imaging device 1000, in accordance with an embodiment of the invention. Imaging device 1000 comprises an optical device 1002 (further detailed hereinbelow), an array of optical detectors 1004, a housing assembly 1006, and a circuit substrate 1008. Optical device 1002 comprises a parallelepiped dielectric substrate 1010, which is transparent at the wavelength of the optical radiation intended to be captured by pattern detector 1000. A transmissive MOE 1012, two reflecting MOEs 1014 and 1016, and two planar reflectors 1018 and 1020 are formed on substrate 1010. Optical device 1002 is attached to housing assembly 1006 with cement 1022. Housing assembly 1006 is bonded to circuit substrate 1008 by cement 1024 using active or passive alignment.

Imaging device 1000 captures optical radiation, schematically shown as multiple arrows 1026, which is reflected from a target. For example, the captured radiation may correspond to a pattern of spots formed on the target by one of the optical pattern projectors described above. The captured radiation impinges on transmissive MOE 1012, which focuses the radiation and transmits it into a beam 1028. (Beam 1028 and subsequent beams are shown, for the sake of clarity, as single arrows, although each beam carries information from a spatial pattern.) Reflector 1018 reflects beam 1028 into a beam 1030, which impinges on reflecting MOE 1014. MOE 1014 reflects and focuses beam 1030 into a beam 1032, which is reflected by reflector 1020 into a beam 1034. Beam 1034 impinges on reflecting MOE 1016, which further focuses the beam into a beam 1036 and deflects it by an angle β so that beam 1036 impinges on detector array 1004. The optical powers and relative spacings of MOEs 1012, 1014, and 1016 have been designed so that the target is imaged onto detector array 1004.

Figure 12:
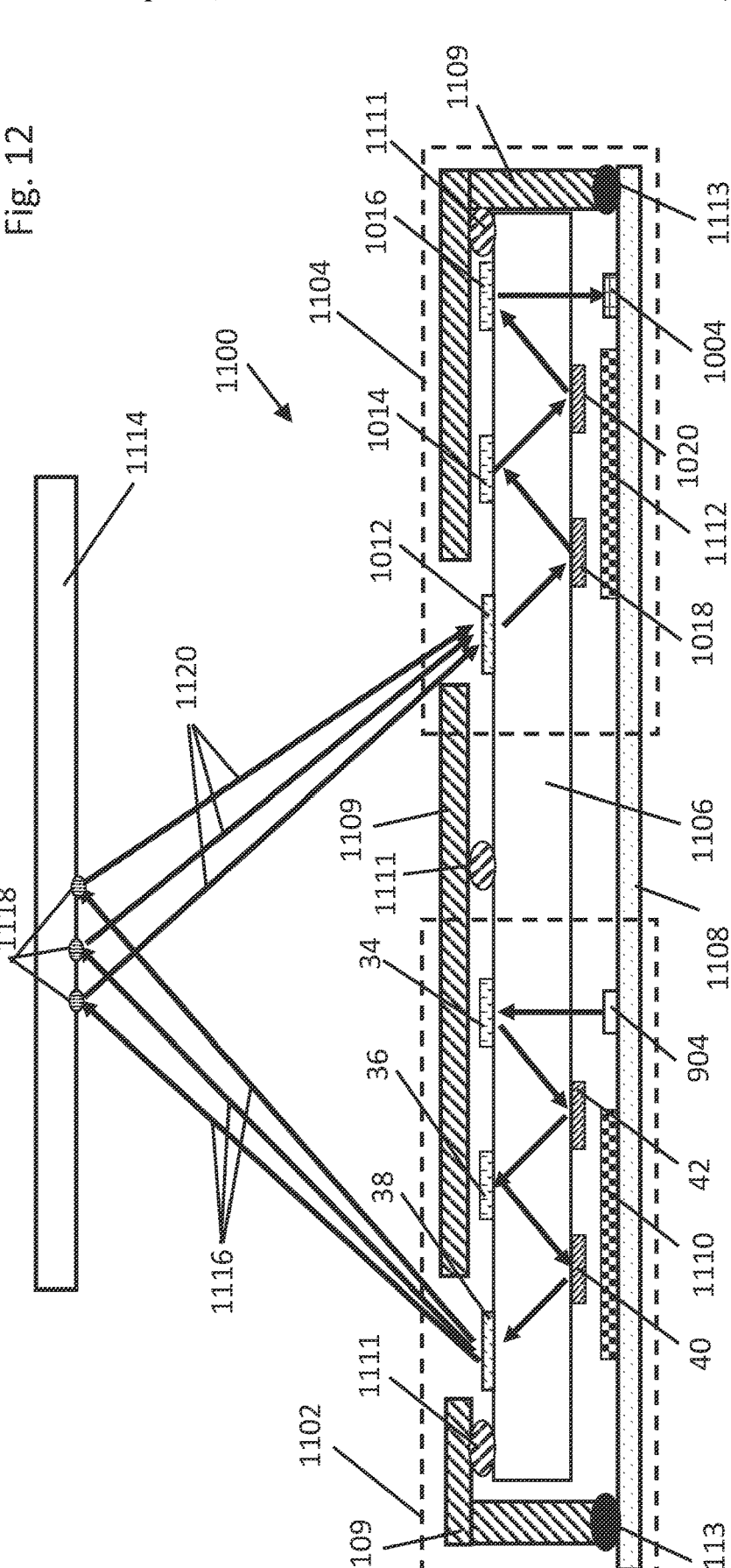
FIG. 12 is a schematic sectional view of a depth sensor, in accordance with an embodiment of the invention

FIG. 12 is a schematic sectional view of a depth sensor 1100, in accordance with an embodiment of the invention. Depth sensor 1100 comprises an optical pattern projector 1102, which is identical with or similar to pattern projector 900 (FIG. 10), and an optical imaging device 1104, which is identical with or similar to imaging device 1000 (FIG. 11). Labels from FIGS. 10 and 11 have been used to label identical or similar items. Substrate 24 of optical device 902 (FIG. 10) and substrate 1010 of optical device 1002 (FIG. 11) have been combined into a substrate 1106. Similarly, respective circuit substrates 906 and 1008 of pattern projector 900 and imaging device 1000 have been combined into a circuit substrate 1108. Housing assemblies 908 and 1006 have been combined to a housing assembly 1109. Substrate 1106 is attached to housing assembly 1109 with cement 1111. Housing assembly 1109 is bonded to circuit substrate 1108 using cement 1113. Electronic circuitry 1110 of pattern projector 1102 is mounted on circuit substrate 1108 and coupled to VCSEL 904 for driving the VCSEL. Electronic circuitry 1112 of imaging device 1104 is mounted on circuit substrate 1108, coupled to detector array 1004, and configured for capturing and processing the signals from the detector array and computing the depth of a scene 1114.

For measuring a distance to scene 1114 (scene depth), pattern projector 1102 projects, similarly to optical device 20 (FIGS. 1a-1b), multiple beams 1116 of optical radiation toward the scene, illuminating spots 1118 on the scene. Imaging device 1104 captures, similarly to imaging device 1000 (FIG. 11), a portion of the reflected radiation from spots 1118, denoted by arrows 1120, and images the spots onto detector array 1004. Electronic circuitry 1112 captures the signals from detector array 1004 and computes the distances from depth sensor 1100 to respective spots 1118.

As previously discussed, the disclosed MOE-based designs enable the fabrication of very thin devices: a typical thickness of the substrate in the pictured embodiments, such as substrate 24 in FIGS. 1a-1b, is between 0.5 and 0.7 mm. As the optical elements disposed on the substrate, such as MOEs and planar reflectors, have respective thicknesses in the range of a few microns, the overall thickness of pattern projector 900 in FIG. 10, imaging device 1000 in FIG. 11, and depth sensor 1100 may be less than 2 mm.

Although the pictured embodiments use a single VCSEL as the source of coherent optical radiation, optical devices in accordance with these embodiments may similarly be used in conjunction with other sorts of coherent sources, as well as with arrays of coherent sources.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical device, comprising:
   a substrate comprising a parallelepiped of a transparent dielectric material configured for propagation of a beam of optical radiation through the substrate along a beam path that includes multiple internal reflections within the substrate; and
   first and second optical metasurfaces disposed respectively on opposing, first and second faces of the substrate at different, first and second points of incidence of the beam path with the one or more faces.

2. The optical device according to claim 1, wherein the first optical metasurface is configured to deflect the beam of optical radiation entering the substrate so that the beam propagates through the substrate along the beam path.

3. The optical device according to claim 2, wherein the second optical metasurface is configured to couple the beam of optical radiation propagating along the beam path out of the substrate while splitting the beam into multiple output beams.

4. The optical device according to claim 1, and wherein at least one of the first and second optical metasurfaces is configured to focus the beam propagating along the beam path.

5. The optical device according to claim 1, and comprising one or more reflectors disposed on one or more of the faces at one or more further points of incidence of the beam path with the one or more faces.

6. An optical device, comprising:
   a substrate comprising a parallelepiped of a transparent dielectric material configured for propagation of a beam of optical radiation through the substrate along a beam path that includes multiple internal reflections within the substrate;
   first and second optical metasurfaces disposed on one or more faces of the substrate at different, first and second points of incidence of the beam path with the one or more faces; and
   one or more reflectors disposed on one or more of the faces at one or more further points of incidence of the beam path with the one or more faces,
   wherein the one or more reflectors are disposed respectively on first and second side faces of the substrate, which are angled obliquely relative to the entrance and exit faces.

7. The optical device according to claim 6, wherein the first and second optical metasurfaces are both disposed on a first face of the substrate, and wherein the one or more reflectors are disposed on a second face of the substrate, opposite the first face.

8. The optical device according to claim 1, wherein the beam enters the substrate through an entrance face of the substrate and exits the substrate through an exit face of the substrate, and wherein the first and second faces are angled obliquely relative to the entrance and exit faces.

9. The optical device according to claim 1, and comprising at least a third optical metasurface disposed on at least one of the faces of the substrate at one or more further points of incidence of the beam path with the one or more faces.

10. The optical device according to claim 9, wherein at least one of the optical metasurfaces is configured to deflect the beam within the substrate at an oblique angle, such that the beam path is not contained within a single plane.

11. The optical device according to claim 1, wherein the first and second optical metasurfaces comprise arrays of pillars of varying diameters, which are formed on the one or more faces of the substrate.

12. The optical device according to claim 11, wherein the pillars comprise a semiconductor material.

13. The optical device according to claim 11, wherein the pillars comprise a metallic material.

14. The optical device according to claim 1, wherein at least one of the first and second optical metasurfaces is configured for transmission of the beam therethrough.

15. The optical device according to claim 1, wherein at least one of the first and second optical metasurfaces is configured for reflection of the beam therefrom.

16. The optical device according to claim 15, and comprising a reflective layer disposed over the at least one of the first and second optical metasurfaces.

17. An optoelectronic apparatus, comprising:

an emitter configured to emit a beam of coherent optical radiation;

an optical substrate comprising a parallelepiped of a transparent dielectric material positioned to intercept the beam emitted by the emitter and configured for propagation of the beam through the optical substrate along a beam path that includes multiple internal reflections within the substrate;

at least first and second optical metasurfaces disposed on one or more faces of the optical substrate at different, first and second points of incidence of the beam path with the one or more faces, and configured to couple the beam out of the substrate while splitting the beam into multiple output beams, wherein the at least first and second optical metasurfaces are configured to collimate the multiple output beams so as to project a pattern of spots onto a target; and an imaging device, which comprises a detector array and one or more metasurface optical elements, which are configured to image the target onto the detector array.

18. The apparatus according to claim 17, and comprising a circuit substrate, on which the emitter and the optical substrate are mounted.

\*    \*    \*    \*    \*